United States Patent
Mao

(10) Patent No.: US 12,477,561 B2
(45) Date of Patent: Nov. 18, 2025

(54) SCHEDULING IN A RADIO TELECOMMUNICATIONS NETWORK

(71) Applicant: Nokia Technologies Oy, Espoo (FI)

(72) Inventor: Xiaomao Mao, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 401 days.

(21) Appl. No.: 18/007,107

(22) PCT Filed: Aug. 6, 2020

(86) PCT No.: PCT/EP2020/072183
§ 371 (c)(1),
(2) Date: Jan. 27, 2023

(87) PCT Pub. No.: WO2022/028703
PCT Pub. Date: Feb. 10, 2022

(65) Prior Publication Data
US 2023/0232419 A1   Jul. 20, 2023

(51) Int. Cl.
*H04W 72/232*   (2023.01)
*H04L 5/00*   (2006.01)

(52) U.S. Cl.
CPC ......... *H04W 72/232* (2023.01); *H04L 5/0053* (2013.01)

(58) Field of Classification Search
CPC ................ H04L 1/0061; H04L 1/0072; H04L 5/0092; H04L 5/0094; H04L 5/0044;
(Continued)

(56) References Cited

U.S. PATENT DOCUMENTS

2016/0100382 A1   4/2016 He et al.
2019/0190644 A1*  6/2019 Ugurlu ............... H04L 27/2607
2019/0230574 A1   7/2019 Novlan et al.
(Continued)

FOREIGN PATENT DOCUMENTS

WO   2019/215704 A1   11/2019

OTHER PUBLICATIONS

"On PDCCH enhancements for NR URLLC", 3GPP TSG RAN WG1 #98, R1-1908235, Agenda Item: 7.2.6.1, ZTE, Aug. 26-30, 2019, pp. 1-18.
"3rd Generation Partnership Project; Technical Specification Group Radio Access Network; NR; Multiplexing and channel coding (Release 16)", 3GPP TS 38.212, V16.1.0, Mar. 2020, pp. 1-146.
(Continued)

*Primary Examiner* — Dady Chery
(74) *Attorney, Agent, or Firm* — Carter, DeLuca & Farrell LLP

(57) ABSTRACT

A mobile equipment comprising means for: receiving via signalling at a higher layer than a physical layer, a downlink control information (DCI) format; receiving via signalling at a higher layer than the physical layer, information defining a look-up table for converting a received index to a scheduling sequence representing, based on the DCI format, scheduling information; receiving a DCI sequence at the physical layer, the DCI sequence comprising an index for indexing one of a plurality of predetermined different scheduling sequences; using the look-up table to convert the received index to a scheduling sequence representing, based on the DCI format, scheduling information; and using the DCI format to obtain the scheduling information, for configuring the mobile equipment for data communication, from the scheduling sequence representing, based on the DCI format, the scheduling information. A network node comprising means for: sending to a user equipment (UE), via
(Continued)

signalling at a higher layer than a physical layer: a downlink control information (DCI) format, that enables the UE to obtain scheduling information, for scheduling the UE for data communication, from a scheduling sequence representing, based on the DCI format, the scheduling information; and information defining a look-up table for converting an index to a scheduling sequence representing, based on the DCI format, the scheduling information; and sending to the user equipment a DCI sequence at the physical layer, the DCI sequence comprising an index indexing one of a plurality of predetermined different scheduling sequences.

1 Claim, 4 Drawing Sheets

(58) Field of Classification Search
CPC ............ H04L 5/0053; H04W 72/0446; H04W 72/0466; H04W 76/11; H04W 76/27; H04W 80/08; H04W 72/232; H04W 72/23
See application file for complete search history.

(56) References Cited

U.S. PATENT DOCUMENTS

2019/0274032 A1    9/2019  Chatterjee et al.
2019/0394759 A1*  12/2019  Ying .................... H04L 1/0061

OTHER PUBLICATIONS

Miao et al., "Configurable distributed physical downlink control channel for 5G new radio: Resource bundling and diversity trade-off", IEEE Wireless Communications and Networking Conference Workshops (WCNCW), Apr. 15-18, 2018, pp. 368-372.

Rajesh et al., "Impact of dynamic control format indicator on downlink throughput performance in LTE system", International Conference on Electronics, Information, and Communication (ICEIC), Jan. 24-27, 2018, 4 pages.

"3rd Generation Partnership Project; Technical Specification Group Radio Access Network; Evolved Universal Terrestrial Radio Access (E-UTRA); Multiplexing and channel coding (Release 16)", 3GPP TS 36.212, V16.2.0, Jun. 2020, pp. 1-253.

International Search Report and Written Opinion received for corresponding Patent Cooperation Treaty Application No. PCT/EP2020/072183, dated Apr. 29, 2021, 11 pages.

* cited by examiner

SCHEDULING IN A RADIO TELECOMMUNICATIONS NETWORK

RELATED APPLICATION

This application was originally filed as PCT Application No. PCT/EP2020/072183, filed on Aug. 6, 2020, which is incorporated herein by reference in its entirety.

TECHNOLOGICAL FIELD

Embodiments of the present disclosure relate to scheduling in a radio telecommunications network.

BACKGROUND

In a radio telecommunications network transmission can be scheduled. It can therefore be necessary to transfer scheduling information to a transmitter and/or a receiver.

BRIEF SUMMARY

According to various, but not necessarily all, embodiments there is provided a mobile equipment comprising means for:
receiving via signalling at a higher layer than a physical layer, a downlink control information (DCI) format;
receiving via signalling at a higher layer than the physical layer, information defining a look-up table for converting a received index to a scheduling sequence representing, based on the DCI format, scheduling information;
receiving a DCI sequence at the physical layer, the DCI sequence comprising an index for indexing one of a plurality of predetermined different scheduling sequences;
using the look-up table to convert the received index to a scheduling sequence representing, based on the DCI format, scheduling information; and
using the DCI format to obtain the scheduling information, for configuring the mobile equipment for data communication from the scheduling sequence representing, based on the DCI format, the scheduling information.

In some but not necessarily all examples, the look-up table, comprises a plurality of entries associated with a DCI format, and maps, one-to-one, an index to an entry that is a representation, based on the associated DCI format, of a unique scheduling sequence.

In some but not necessarily all examples, the look-up table is specific to the associated DCI format and only comprises entries associated with the DCI format.

In some but not necessarily all examples, the look-up table is initially configured by layer 3 signalling and/or wherein the look-up table is updated by layer 2 signalling.

In some but not necessarily all examples, the DCI format is configured by layer 3 signalling.

In some but not necessarily all examples, the DCI format is a legacy DCI format.

In some but not necessarily all examples, the mobile equipment comprises means for:
receiving a DCI sequence at the physical layer, the DCI sequence comprising a representation, based on a DCI format, of the scheduling information; and
using a DCI format, to obtain the scheduling information, for configuring the mobile equipment for data communication, from the representation, based on the DCI format, of the scheduling information.

According to various, but not necessarily all, embodiments there is provided a method comprising:
receiving via signalling at a higher layer than a physical layer, a downlink control information (DCI) format;
receiving via signalling at a higher layer than the physical layer, information defining a look-up table for converting a received index to a scheduling sequence representing, based on the DCI format, scheduling information;
receiving a DCI sequence at the physical layer, the DCI sequence comprising an index for indexing one of a plurality of predetermined different scheduling sequences;
using the look-up table to convert the received index to a scheduling sequence representing, based on the DCI format, scheduling information; and
using the DCI format to obtain the scheduling information, for configuring the mobile equipment for data communication, from the scheduling sequence representing, based on the DCI format, the scheduling information.

According to various, but not necessarily all, embodiments there is provided a computer program that when loaded in a processor of a user equipment causes the user equipment to:
use a look-up table, defined by received information, to convert an index to a scheduling sequence representing, based on a received DCI format, scheduling information, wherein the index is from a received DCI sequence; and
using the DCI format, to obtain the scheduling information, for configuring the mobile equipment for data communication, from the scheduling sequence representing, based on the DCI format, the scheduling information.

According to various, but not necessarily all, embodiments there is provided a network node comprising means for:
sending to a user equipment (UE), via signalling at a higher layer than a physical layer:
a downlink control information (DCI) format, that enables the UE to obtain scheduling information, for scheduling the UE for data communication, from a scheduling sequence representing, based on the DCI format, the scheduling information; and
information defining a look-up table for converting an index to a scheduling sequence representing, based on the DCI format, the scheduling information; and
sending to the user equipment a DCI sequence at the physical layer, the DCI sequence comprising an index indexing one of a plurality of predetermined different scheduling sequences.

In some but not necessarily all examples, the network node comprises means
for using the DCI format, to convert scheduling information to the scheduling sequence and, then,
for using the look-up table, in reverse, to convert the scheduling sequence into the index indexing the scheduling sequence and, then,
including the index in the transmitted DCI sequence.

In some but not necessarily all examples, the network node comprises means for control population of the look-up table for converting, at the UE, a received index indexing a scheduling sequence to the indexed scheduling sequence, wherein said control is dependent upon a statistical model of scheduling sequences previously signalled to the UE.

In some but not necessarily all examples, the network node comprises means for initially sending to the UE, via signalling at layer 3: the DCI format and the information defining the look-up table; updating at least the look-up table via signalling to the UE at layer 2; and periodically sending, to the UE, DCI sequences at the physical layer.

According to various, but not necessarily all, embodiments there is provided a method comprising:
sending to a user equipment (UE), via signalling at a higher layer than a physical layer:
a downlink control information (DCI) format, that enables the UE to obtain scheduling information, for scheduling the UE for data communication, from a scheduling sequence representing, based on the DCI format, the scheduling information; and
information defining a look-up table for converting an index to a scheduling sequence representing, based on the DCI format, the scheduling information; and
sending a DCI sequence at the physical layer, the DCI sequence comprising an index indexing one of a plurality of predetermined different scheduling sequences.

According to various, but not necessarily all, embodiments there is provided a computer program that when run on a network node causes the network node to:
send to a user equipment (UE), via signalling at a higher layer than a physical layer:
a downlink control information (DCI) format, that enables the UE to obtain scheduling information, for scheduling the UE for data communication, from a scheduling sequence representing, based on the DCI format, the scheduling information; and
information defining a look-up table for converting an index to a scheduling sequence representing, based on the DCI format, the scheduling information; and
send to the user equipment a DCI sequence at the physical layer, the DCI sequence comprising an index indexing one of a plurality of predetermined different scheduling sequences.

According to various, but not necessarily all, embodiments there is provided a network node comprising means for controlling signalling of scheduling to a user equipment, wherein said control is dependent upon a statistical model of scheduling previously signalled to the UE.

According to various, but not necessarily all, embodiments there is provided examples as claimed in the appended claims.

BRIEF DESCRIPTION

Some examples will now be described with reference to the accompanying drawings in which.

DEFINITIONS

DCI: downlink control information.
DCI sequence: physical layer signalling that is converted to scheduling information.
Scheduling information: information for scheduling at least uplink transmissions from a user equipment.
DCI format: used to obtain scheduling information from a representation, based on the DCI format, of the scheduling information.
Legacy DCI sequence: physical layer signalling comprising a representation, based on a legacy DCI format, of scheduling information.
Legacy DCI format: a DCI format used to obtain scheduling information from a legacy DCI sequence.
Nominate DCI sequence: physical layer signalling comprising an index for conversion to a scheduling sequence.
Scheduling sequence: a representation, based on a DCI format, of scheduling information that is indexed by an index comprised in a DCI sequence.
DL: Downlink
UL: Uplink
PDSCH: physical downlink shared channel
PUSCH: physical uplink shared channel
PDCCH: physical downlink control channel
ARQ: automatic repeat request
layer: a protocol layer of a protocol stack
RRC: Radio Resource Control
MAC: Medium Access Control

DETAILED DESCRIPTION

Figure 1:
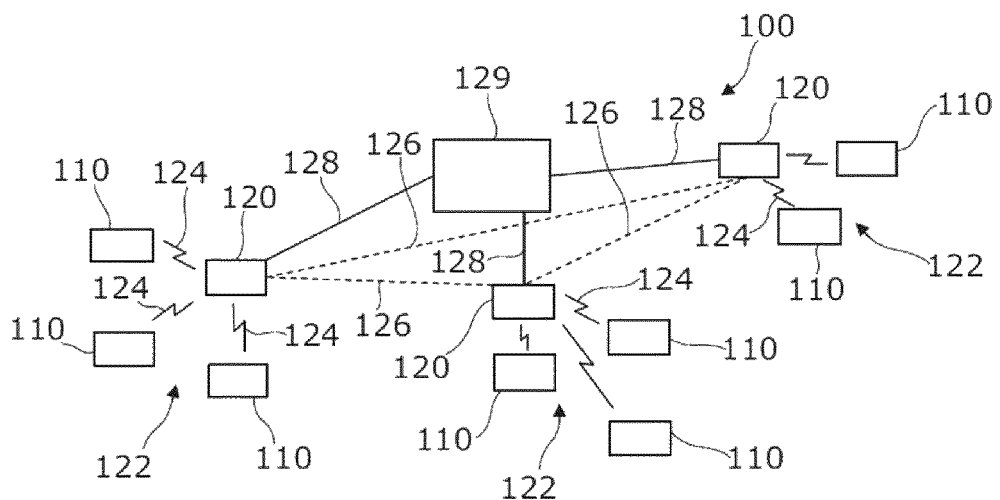
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a radio telecommunications network, in which at least some of the terminal nodes 110 and access nodes 120 communicate with each other using transmission/reception of radio waves.

The one or more core nodes 129 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124. The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations. The user equipment (UE) comprises mobile equipment (ME).

In the particular example illustrated the network 100 is an Evolved Universal Terrestrial Radio Access network (E-UTRAN). The E-UTRAN consists of E-UTRAN NodeBs (eNBs) 120, providing the E-UTRA user plane and control plane (RRC) protocol terminations towards the UE 110. The eNBs 120 are interconnected with each other by means of an X2 interface 126. The eNBs are also connected by means of the S1 interface 128 to the Mobility Management Entity (MME) 129.

In other example the network 100 is a Next Generation (or New Radio, NR) Radio Access network (NG-RAN). The NG-RAN consists of gNodeBs (gNBs) 120, providing the user plane and control plane (RRC) protocol terminations towards the UE 110. The gNBs 120 are interconnected with each other by means of an X2/Xn interface 126. The gNBs are also connected by means of the N2 interface 128 to the Access and Mobility management Function (AMF).

Figure 2:
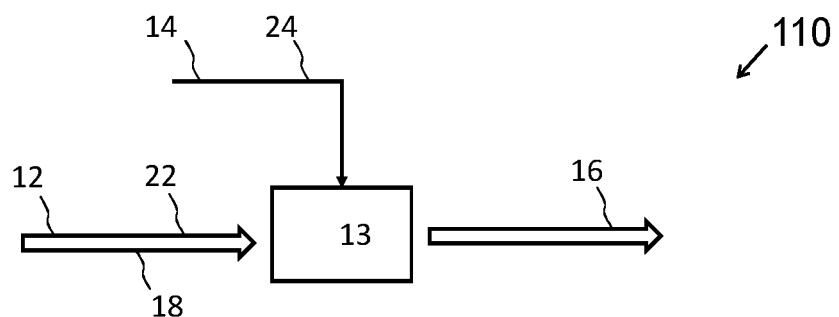
FIG. 2 shows another example of the subject matter described herein.
Figure 3A:
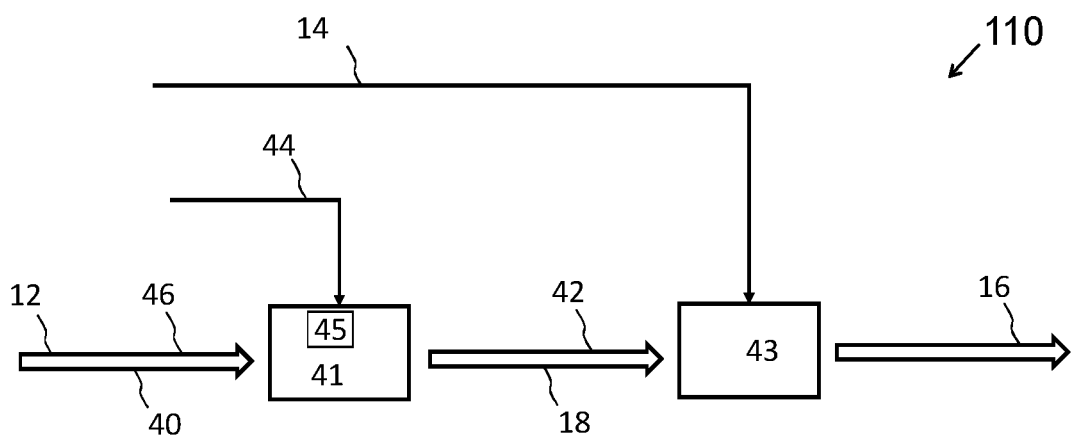
FIG. 3A shows another example of the subject matter described herein.
Figure 3B:
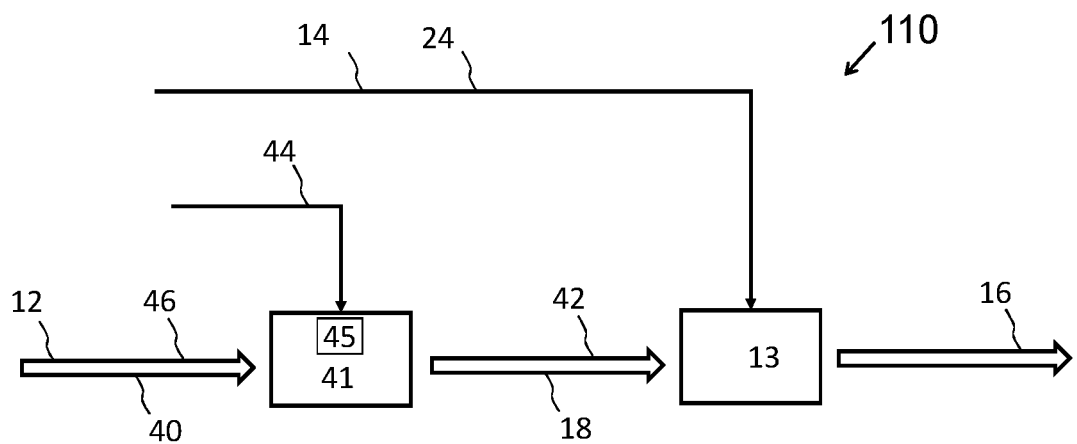
FIG. 3B shows another example of the subject matter described herein.

In a 3GPP network, downlink control information (DCI) is used to control scheduling. As illustrated in FIGS. 2, 3A, 3B a DCI sequence 12 is physical layer signalling that is converted to scheduling information 16. The scheduling information 16 is information for scheduling at least uplink transmissions from a user equipment 110. A DCI format 14 is used to obtain scheduling information 16 from a representation 18, based on the DCI format, of the scheduling information 16.

A DCI sequence 12 is scheduling information signalling at the physical layer, via PDCCH. The DCI sequence 12 at least schedules DL transmissions on PDSCH and/or UL transmissions on PUSCH. A DCI sequence provides: downlink assignments containing at least modulation and coding format, resource allocation, and hybrid-ARQ information; and/or uplink scheduling grants containing at least modulation and coding format, resource allocation, and hybrid-ARQ information.

A representation 18, based on a DCI format 14, of scheduling Information 16, comprises information bits $a_0$ to $a_{A-1}$. The DCI format 14 defines fields and a mapping between fields of scheduling information 16 and the information bits $a_0$ to $a_{A-1}$ of the representation 18, based on the DCI format 14. For example, each field can be mapped in the order in which it appears in a description of the DCI Format in 3GPP TS 36.212, including the zero-padding bit(s), if any, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

In the example illustrated in FIG. 2, a representation 18, based on a DCI format 14, of the scheduling information 16 is comprised in a DCI sequence 12. This FIG. 2 corresponds to a legacy 3GPP implementation in which the DCI sequence 12 is a legacy DCI sequence 22. The legacy DCI sequence 22 is physical layer signalling comprising a representation 18, based on a legacy DCI format 24, of scheduling information 16. Legacy DCI format 24 is a DCI format 14 used to obtain scheduling information 16 from a legacy DCI sequence 22. The legacy DCI formats 24 include Formats 0, 0A, 0B . . . 7-1F, 7-1G as described in 3GPP TS 36.212 V16.2.0 (2020-06).

The mobile equipment 110 in FIG. 2 comprises means for:
receiving a DCI format 14;
receiving a DCI sequence 12 at the physical layer, the DCI sequence 12 comprising a representation 18, based on the DCI format 14, of scheduling information 16; and
using the DCI format 14 to obtain 13 the scheduling information 16, for configuring the mobile equipment 110 for data communication, from the DCI sequence 12 representing 18, based on the DCI format 14, the scheduling information 16.

In the example illustrated in FIGS. 3A and 3B, a representation 18, based on a DCI format 14, of the scheduling information 16 is comprised in a scheduling sequence 42. The DCI sequence 12 is physical layer signalling comprising an index 40 that is converted to scheduling sequence 42 via a look-up table 45. The DCI sequence 12 comprising an index 40 can be referred to as a nominate DCI sequence 46. In FIG. 3B, the representation 18, comprised in a scheduling sequence 42, is a representation based on a legacy DCI format 24.

FIGS. 3A and 3B, illustrate examples of a mobile equipment 110 comprising means for:
receiving via signalling at a higher layer than a physical layer, a downlink control information format 14;
receiving via signalling at a higher layer than the physical layer, information 44 defining a look-up table 45 for converting a received index 40 to a scheduling sequence 42 representing, based on the DCI format 14, scheduling information 16;
receiving a downlink control information sequence 12 at the physical layer, the DCI sequence 12 comprising an index 40 for indexing one of a plurality of predetermined different scheduling sequences 42;
using the look-up table 45 to convert 41 the received index 40 to a scheduling sequence 42 comprising a representation 18, based on the DCI format 14, of scheduling information 16; and
using the DCI format 14 to obtain 43 the scheduling information 16, for configuring the mobile equipment 110 for data communication, from the scheduling sequence 42 representing, based on the DCI format 14, the scheduling information 16.

In FIG. 3B the DCI format is a legacy DCI format 24. The look-up table 45 is configured to convert 41 a received index 40 to a scheduling sequence 42 comprising a representation 18, based on the legacy DCI format 24, of scheduling information 16. The process for obtaining 13 the scheduling information 16 from representation 18, based on the legacy DCI format 24, of the scheduling information 16 is the same as in FIG. 2. In FIG. 2 the representation 18 is comprised within the legacy DCI sequence 22. In FIG. 3B, the representation 18 is comprised in a scheduling sequence 42.

It will be appreciated that the process for obtaining the scheduling information 16 from the DCI sequence 12 (FIG. 2) is a one-hop (13) process whereas in FIG. 3A it is a two-hop (41, 43) process and in FIG. 3B it is a two-hop (41, 13) process.

It will be appreciated that DCI sequence 12 in FIGS. 3A and 3B comprises an index 40. The DCI sequence 12 is a nominate DCI sequence 46 different to a legacy DCI index 22 in that the nominate DCI sequence 46 comprises an index 40 that is ultimately used to obtain 41 a representation 18, based on the DCI format 14, of scheduling information 16 and the legacy DCI sequence 22 comprises the representation 18, based on the legacy DCI format 24, of the scheduling information 16.

Figure 4A:
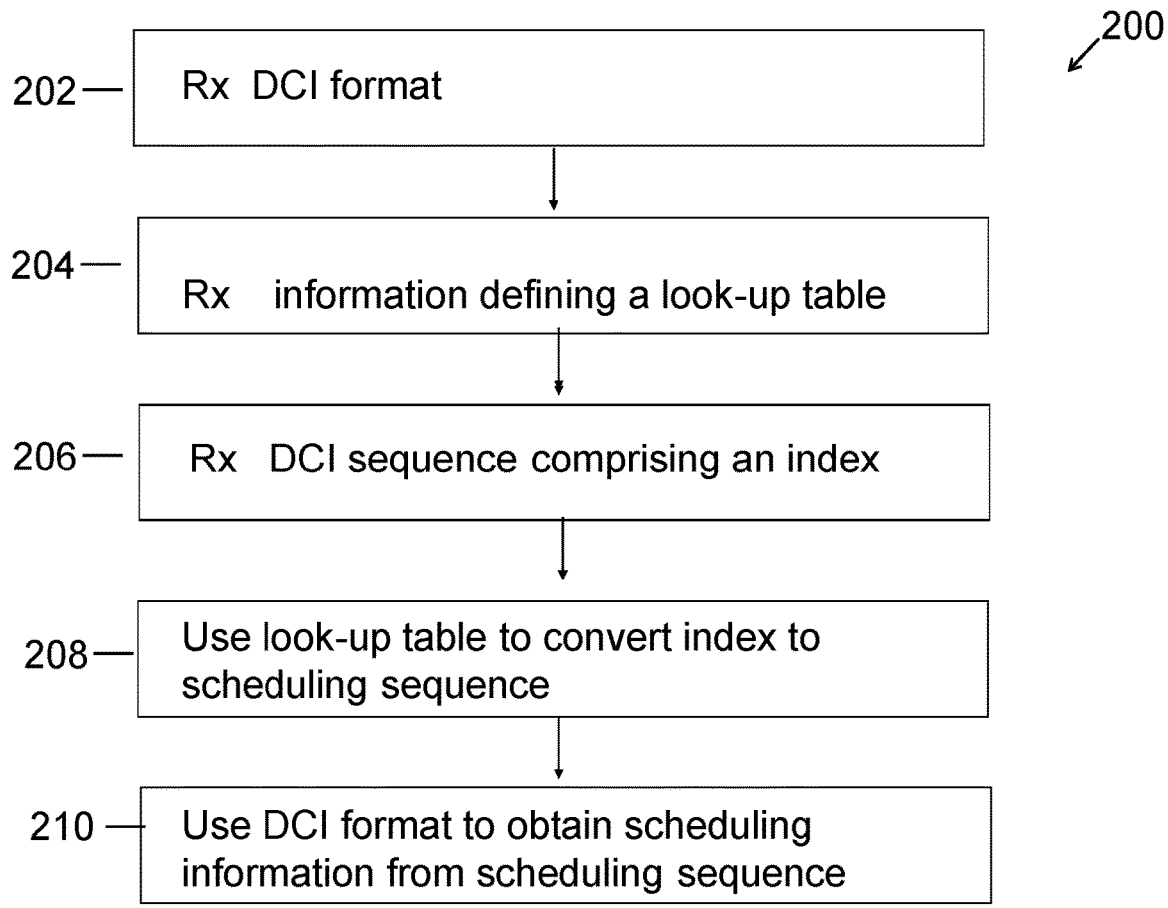
FIG. 4A shows another example of the subject matter described herein.

FIG. 4A illustrates an example of a method 200. The method can be performed at a network node, for example a user equipment 110.

At block 202, the method 200 comprises receiving via signalling at a higher layer than a physical layer, a downlink control information (DCI) format 14.

At block 204, the method 200 comprises receiving via signalling at a higher layer than the physical layer, information 44 defining a look-up table 45 for converting a received index to a scheduling sequence representing, based on the DCI format, scheduling information.

At block 206, the method 200 comprises receiving a DCI sequence 12 at the physical layer, the DCI sequence comprising an index 40 for indexing one of a plurality of predetermined different scheduling sequences.

At block 208, the method 200 comprises using the look-up table 45 to convert the received index 40 to a scheduling sequence 42 comprising a representation 18, based on the DCI format 14, of scheduling information.

At block 210, the method 200 comprises using the DCI format 14 to obtain the scheduling information 16, for configuring the mobile equipment 110 for data communication, from the scheduling sequence 42 representing 18, based on the DCI format 14, the scheduling information 16.

Figure 5:
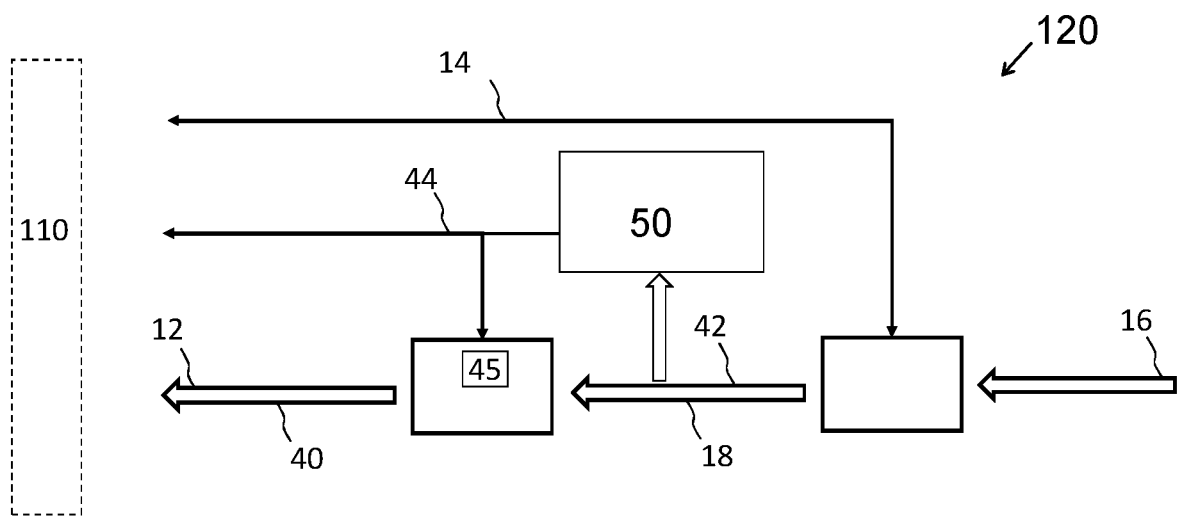
FIG. 5 shows another example of the subject matter described herein.
Figure 4B:
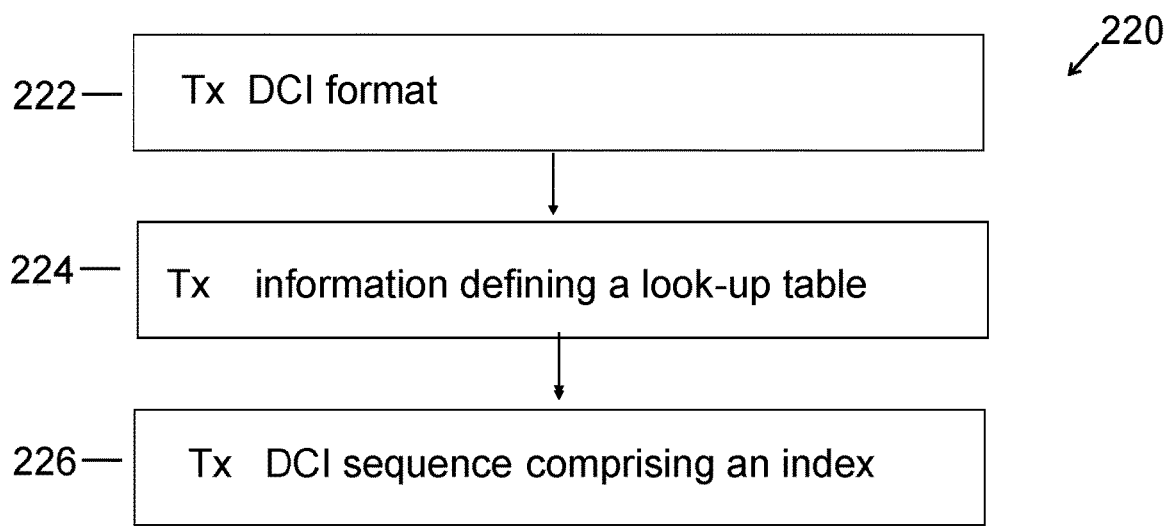
FIG. 4B shows another example of the subject matter described herein.

While the processes of FIGS. 3A and 3B, and FIG. 4A have been described with reference to the user equipment 10, there are corresponding processes performed at a network node as illustrated in FIG. 4B and FIG. 5.

FIG. 4B illustrates an example of a method 220. The method can be performed at a network node, for example an access node 120.

At block 222, the method 220 comprises sending to a user equipment (UE) 110, via signalling at a higher layer than a physical layer, a DCI format 14, that enables the UE 110 to obtain scheduling information 16, for scheduling the UE 110 for data communication, from a scheduling sequence 42 comprising a representation 18, based on the DCI format 14, of the scheduling information 16.

At block 224, the method 220 comprises sending to a user equipment (UE) 110, via signalling at a higher layer than a physical layer, information 44 defining a look-up table 45 for converting an index 40 to a scheduling sequence 42 comprising a representation 18, based on the DCI format 14, of the scheduling information 16.

At block 226, the method 220 comprises sending to a user equipment (UE) 110 a DCI sequence 12 at the physical layer, the DCI sequence 12 comprising an index 40 indexing one of a plurality of predetermined different scheduling sequences 42.

As illustrated in FIG. 5, the network node, for example access node 120 can comprise means for:

sending to a user equipment (UE) 110, via signalling at a higher layer than a physical layer:
  a DCI format 14, that enables the UE 110 to obtain scheduling information 16, for scheduling the UE 110 for data communication, from a scheduling sequence 42 representing 18, based on the DCI format 14, the scheduling information 16; and
  information 44 defining a look-up table 45 for converting an index 40 to a scheduling sequence 42 representing 18, based on the DCI format 14, the scheduling information 16; and
sending to the user equipment 110 a DCI sequence 12 at the physical layer, the DCI sequence 12 comprising an index 40 indexing one of a plurality of predetermined different scheduling sequences 42.

The processes of FIGS. 3A and 3B can be run in reverse by the network to convert scheduling information 16 to an index comprised in a DCI sequence 12.

For example, as illustrated in FIG. 5, the network 120 can comprise means for using the DCI format 14, to convert scheduling information 16 to the scheduling sequence 42 and, then, for using the look-up table 45, in reverse, to convert the scheduling sequence 42 into the index 40 indexing the scheduling sequence and, then, including the index 40 in the transmitted DCI sequence 12.

In the example illustrated, the network node, for example access node 120, comprises means 50 for controlling a population of the look-up table 45. The look-up table 45 is, for example, used for converting, at the UE 110, a received index 40 indexing a scheduling sequence 42 to the indexed scheduling sequence 42. The controller 50 can for example operate to minimize (or otherwise optimize) a size (e.g. number of entries) of the look-up table 45.

In at least some examples, the control is dependent upon a statistical model of scheduling sequences 42 previously signalled to the UE 110. In at least some examples, the statistical model is a machine learning model such as supervised learning for classification.

The machine learning can, for example, be used to learn geographical characteristics of a network cell. In this example, the machine learning can be based on scheduling sequences 42 previously signalled to all UEs 110 in that network cell or it can be based on scheduling sequences 42 previously signalled per UE 110 in that network cell. In particular, modulation and coding schemes (MCS) within the scheduling information 16 associated with entries in the look-up table 45 can be optimally defined. For example, different combinations of beam direction and MCS range encode different volumes of the cell, some of which will be occupied more frequently by a UE 110 or by all UEs 110 because of, for example, geographical relief (elevation) within the cell.

The network node 120 can be configured to initially send to the UE 110, via signalling at layer 3: the DCI format 12 and information 44 defining the look-up table 45.

The network node 120 can be configured to subsequently update the DCI format 12 and/or information 44 defining the look-up table 45 via signalling to the UE at layer 2.

The network node 120 can be configured to periodically send, to the UE 110, a DCI sequence 12 at the physical layer (layer 1). The DCI sequence 12 can be varied in each period.

In the preceding examples, the look-up table 45 predetermines the plurality of predetermined different scheduling sequences 42. In some but not necessarily all examples, the look-up table 45 comprises a plurality of entries associated with a DCI format 14, and maps, one-to-one, an index 40 to an entry that is a unique scheduling sequence 42. Each unique scheduling sequence 42 comprises a unique representation 18 of unique scheduling information 16. The representations 18 are in accordance with the associated DCI format 14. In at least some examples, the look-up table 45 is specific to the associated DCI format 14 and only comprises entries associated with the DCI format 14. The look-up table 45 can be replaced or updated when the DCI format 14 changes. Thus a reception of a new DCI format 14 can be accompanied by reception of information 44 defining the look-up table 45.

In at least some examples, the look-up table 45 is initially configured by layer 3 signalling. For example, information 44 defining the look-up table 45 is comprised in one or more RRC messages.

In at least some examples, the look-up table 45 is updated by layer 2 signalling. For example, information 44 defining the look-up table 45 is comprised in one or more MAC messages.

In at least some examples, the DCI format is sent using layer 3 signalling. For example, the DCI format 14 is comprised in one or more RRC messages.

The DCI sequence 12 is sent at layer 1 (physical layer). The DCI index 12 is a bit sequence comprising an index 40 indexing one of a plurality of predetermined different scheduling sequences 42. A DCI sequence 12 can be sent periodically. The DCI sequence 12 can be sent as a PDCCH payload. The DCI sequence 12 can be obtained at the UE 110 using blind decoding of PDCCH.

The index 40 is dense. The DCI sequence 12 and the index 40 can for example be as short as possible. They can for example comprise the minimum number of bits N in the index 40 needed to index M entries in the look-up table 45 where $\log_2 M \leq N < \log_2 M+1$.

Considering a maximum size (number of entries) $M_{max}$ in the lookup table 45, then the maximum number of bits $N_{max}$ in the index 40 to index $M_{max}$ entries in the look-up table 45 is $\log_2 M_{max} \leq N_{max} < \log_2 M_{max}+1$.

In some examples the value of can be variable and be varied dynamically. In other examples, N can be fixed for example fixed as $N_{max}$.

The scheduling sequence 42 and the representation 18 comprised in the scheduling sequence 42 is a bit sequence, larger than the index 40. The index 40 therefore encodes the scheduling sequence 42/representation 18 via the look-up table 45 which acts as a codebook.

The DCI sequence 12 comprising the index 40 is a nominate DCI sequence 46 different to the legacy DCI index 24. For example, the nominate DCI sequence 24 can comprise an index 40 that is used, at the UE 110, to obtain 41 a representation 18, based on a DCI format 24, of scheduling information 16 while the legacy DCI sequence 24 comprises the representation 18, based on the legacy DCI format 24, of scheduling information 16.

In some examples, for example as illustrated in FIG. 3B, the representation 18, comprised in a scheduling sequence 42, is a representation based on a legacy DCI format 24.

Although FIGS. 2, 3A and 3B are illustrated separately, it should be appreciated that a user equipment 110 can be configured to operate in accordance with FIG. 3A and/or FIG. 3B. Such a user equipment can, optionally, also be configured to operate in accordance with FIG. 2.

A user equipment 110 can, for example, determine whether a received DCI sequence 12 is a legacy DCI sequence 22 or a nominate DCI sequence 46. If the received DCI sequence 12 is determined to be a nominate DCI sequence then the two-hop decoding method of FIG. 3A/3B is performed. If the received DCI sequence 12 is determined to be a legacy DCI sequence 22 then the one-hop legacy decoding method of FIG. 2 is performed. Thus the user equipment 110 previously described can also comprise means for: receiving a DCI sequence 12 (legacy DCI sequence 22) at the physical layer, the DCI sequence 12 (legacy DCI sequence 22) comprising a representation 18, based on a legacy DCI format 24, of the scheduling information 16; and using a legacy DCI format 24, to obtain 13 the scheduling information 16, for configuring the mobile equipment 110 for data communication, from the representation 18, based on the legacy DCI format 24, of scheduling information 16.

The UE 110 can signal the access node 120 at the beginning of an RRC connection, for example, during the RACH process. The UE 110 can inform the network of its capabilities and other information. The capabilities and other information can be taken into account at the network. It can, for example, be used when configuring a look-up table 45 for the UE 110. It can, for example, be taken into account when determining whether to support the process of FIG. 3A, 3B or 2 at the network.

Figure 6:
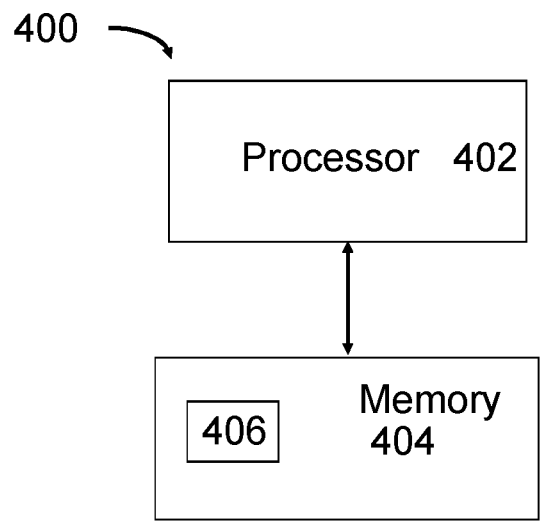
FIG. 6 shows another example of the subject matter described herein.

FIG. 6 illustrates an example of a controller 400. The controller 400 can be a controller for an apparatus. The apparatus can for example, be a terminal node, for example user equipment 110. Alternatively, the apparatus can be a network node, for example an access node 120.

Implementation of a controller 400 may be as controller circuitry. The controller 400 may be implemented in hardware alone, have certain aspects in software including firmware alone or can be a combination of hardware and software (including firmware).

As illustrated in FIG. 6 the controller 400 may be implemented using instructions that enable hardware functionality, for example, by using executable instructions of a computer program 406 in a general-purpose or special-purpose processor 402 that may be stored on a computer readable storage medium (disk, memory etc) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus when loaded into the processor 402. The computer program instructions, of the computer program 406, provide the logic and routines that enables the apparatus to perform any of the methods illustrated in FIGS. 2, 3A, 3B, 4A, 4B, 5. The processor 402 by reading the memory 404 is able to load and execute the computer program 406.

The apparatus, for example user equipment 110, can therefore comprise:
at least one processor 402; and
at least one memory 404 including computer program code
the at least one memory 404 and the computer program code configured to, with the at least one processor 402, cause the apparatus 110 at least to perform:
use a look-up table, defined by received information, to convert an index to a scheduling sequence representing, based on a received DCI format, scheduling information, wherein the index is from a received DCI sequence; and
using the DCI format, to obtain the scheduling information, for configuring the mobile equipment for data communication, from the scheduling sequence representing, based on the DCI format, the scheduling information.

The apparatus, for example access node 120, can therefore comprise:
at least one processor 402; and
at least one memory 404 including computer program code the at least one memory 404 and the computer program code configured to, with the at least one processor 402, cause the apparatus 120 at least to perform:
send to a user equipment (UE), via signalling at a higher layer than a physical layer:
a downlink control information (DCI) format, that enables the UE to obtain scheduling information, for scheduling the UE for data communication, from a scheduling sequence representing, based on the DCI format, the scheduling information; and
information defining a look-up table for converting an index to a scheduling sequence representing, based on the DCI format, the scheduling information; and
send to the user equipment a DCI sequence at the physical layer, the DCI sequence comprising an index indexing one of a plurality of predetermined different scheduling sequences.

Figure 7:
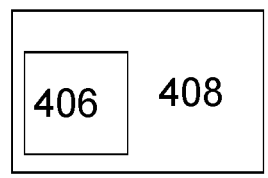
FIG. 7 shows another example of the subject matter described herein.

As illustrated in FIG. 7, the computer program 406 may arrive at the apparatus via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 406. The delivery mechanism may be a signal configured to reliably transfer the computer program 406. The apparatus may propagate or transmit the computer program 406 as a computer data signal.

A computer program 406 can comprise computer program instructions for causing an apparatus, for example user equipment 110, to perform at least the following or for performing at least the following:

use a look-up table, defined by received information, to convert an index to a scheduling sequence representing, based on a received DCI format, scheduling information, wherein the index is from a received DCI sequence; and using the DCI format, to obtain the scheduling information, for configuring the mobile equipment for data communication, from the scheduling sequence representing, based on the DCI format, the scheduling information.

A computer program 406 can comprise computer program instructions for causing an apparatus, for example an access node 120, to perform at least the following or for performing at least the following:

send to a user equipment (UE), via signalling at a higher layer than a physical layer: a downlink control information (DCI) format, that enables the UE to obtain scheduling information, for scheduling the UE for data communication, from a scheduling sequence representing, based on the DCI format, the scheduling information; and information defining a look-up table for converting an index to a scheduling sequence representing, based on the DCI format, the scheduling information; and send to the user equipment a DCI sequence at the physical layer, the DCI sequence comprising an index indexing one of a plurality of predetermined different scheduling sequences.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 2, 3A, 3B, 4A, 4B, 5 may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. An apparatus comprising:
    at least one processor; and
    at least one memory including instructions,
    the at least one memory and the instructions configured to, with the at least one processor, cause
    the apparatus to perform at least:
        receiving via signaling at a higher layer than a physical layer, a downlink control information (DCI) format;
        receiving via signaling at a higher layer than the physical layer, information defining a look-up table for converting a received index to a scheduling sequence representing, based on the DCI format, scheduling information, wherein the look-up table, comprises a plurality of entries associated with a DCI format, and maps, one-to-one, an index to an entry that is a representation, based on the associated DCI format, of a unique scheduling sequence, wherein the look-up table is specific to the associated DCI format and only comprises entries associated with the DCI format, wherein the look-up table is initially configured by layer 3 signaling and the look-up table is updated by layer 2 signaling;
        receiving a DCI sequence at the physical layer, the DCI sequence comprising an index for indexing one of a plurality of predetermined different scheduling sequences;
        using the look-up table to convert the received index to a scheduling sequence representing, based on the DCI format, scheduling information;
        using the DCI format to obtain the scheduling information, for configuring the apparatus for data communication from the scheduling sequence representing, based on the DCI format, the scheduling information, wherein the DCI format is a legacy DCI format,
        receiving a DCI sequence at the physical layer, the DCI sequence comprising a representation, based on a DCI format, of the scheduling information; and using a DCI format, to obtain the scheduling information, for configuring the apparatus for data communication, from the representation, based on the DCI format, of the scheduling information,
wherein the DCI sequence and the index comprise a minimum number of bits N in the index needed to index M entries in the look-up table where $\log_2 M \leq N \leq \log_2 M + 1$.

* * * * *